United States Patent [19]
Du

[11] Patent Number: 6,055,118
[45] Date of Patent: Apr. 25, 2000

[54] HOLDING AUTOMATIC GAIN CONTROL LEVELS DURING READ ERROR RECOVERY IN A DISC DRIVE

[75] Inventor: Ke Du, Oklahoma City, Okla.

[73] Assignee: Seagate Technology, Inc., Scotts Valley, Calif.

[21] Appl. No.: 08/866,689

[22] Filed: May 30, 1997

Related U.S. Application Data

[60] Provisional application No. 60/037,629, Jan. 15, 1997.

[51] Int. Cl.[7] ....................................................... G11B 5/09
[52] U.S. Cl. .................................. 360/46; 360/53; 360/67
[58] Field of Search .................................. 360/46, 53, 67, 360/77.08, 75, 25, 51

[56] References Cited

U.S. PATENT DOCUMENTS

| | | |
|---|---|---|
| 5,136,439 | 8/1992 | Weispfenning et al. . |
| 5,262,907 | 11/1993 | Duffy et al. . |
| 5,276,662 | 1/1994 | Shaver, Jr. et al. . |
| 5,319,508 | 6/1994 | Tsunoda et al. ..................... 360/77.08 |
| 5,422,760 | 6/1995 | Abbott et al. . |
| 5,459,757 | 10/1995 | Minuhim et al. . |
| 5,592,340 | 1/1997 | Minuhim et al. . |
| 5,627,843 | 5/1997 | Deng et al. . |
| 5,631,999 | 5/1997 | Dinsmore . |

OTHER PUBLICATIONS

Finch and Moczarny, "Headerless disk formatting: Making room for more data," Data Storage Magazine, Apr. 1997, p.p. 51, 52, and 54, vol. 4, No. 5, Pennwell Publishing Co., Tulsa, Oklahoma.

*Primary Examiner*—Alan Faber
*Attorney, Agent, or Firm*—Crowe & Dunlevy

[57] ABSTRACT

An apparatus and associated method are disclosed for recovering user data from a data block in a disc drive in which user data are stored by way of a plurality of blocks on tracks of a disc, the blocks including data blocks in which the user data are stored in predefined increments. A head generates readback signals from the blocks and a read channel reconstructs the user data from the readback signals. An automatic gain control stage establishes a gain used to amplify the readback signal to a level suitable for use by the read channel. When an uncorrected read error is detected, the disc drive proceeds to read a previous block sequentially preceding the affected data block and sets the gain to a fixed value based upon the readback signals determined from the previous block. The fixed value of gain is then used to recover the user data from the affected data block.

12 Claims, 6 Drawing Sheets

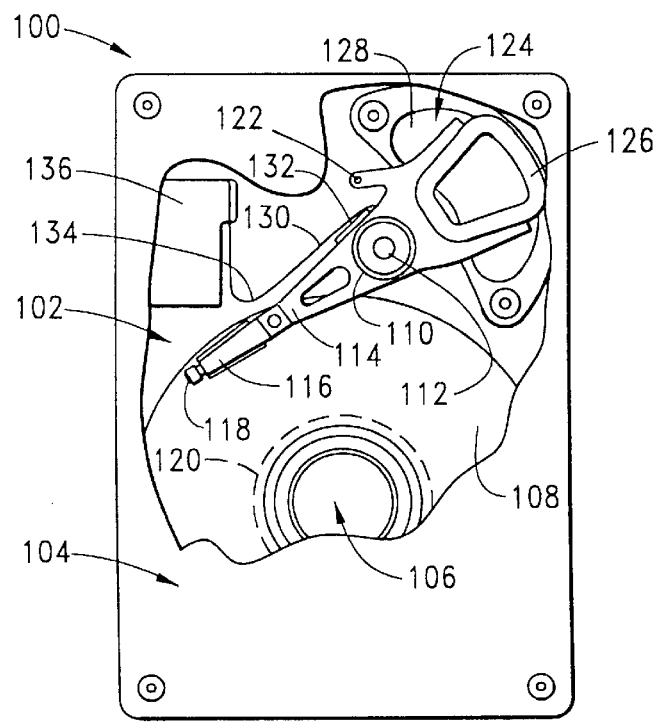
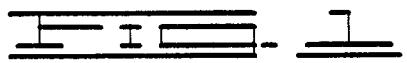
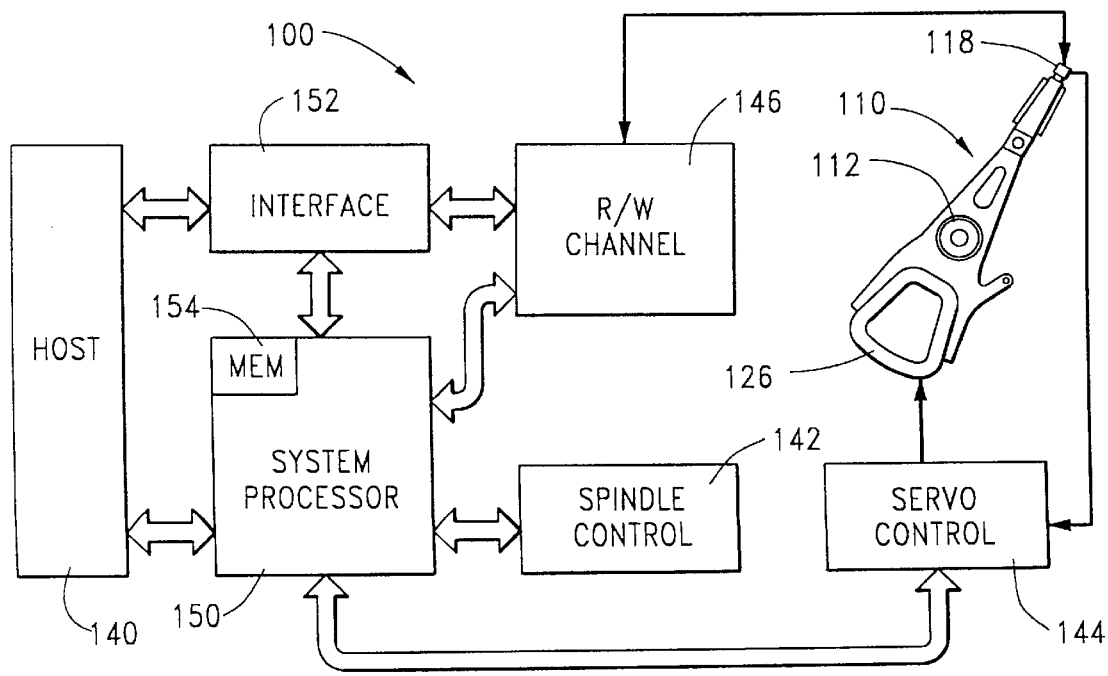
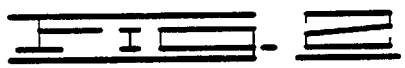

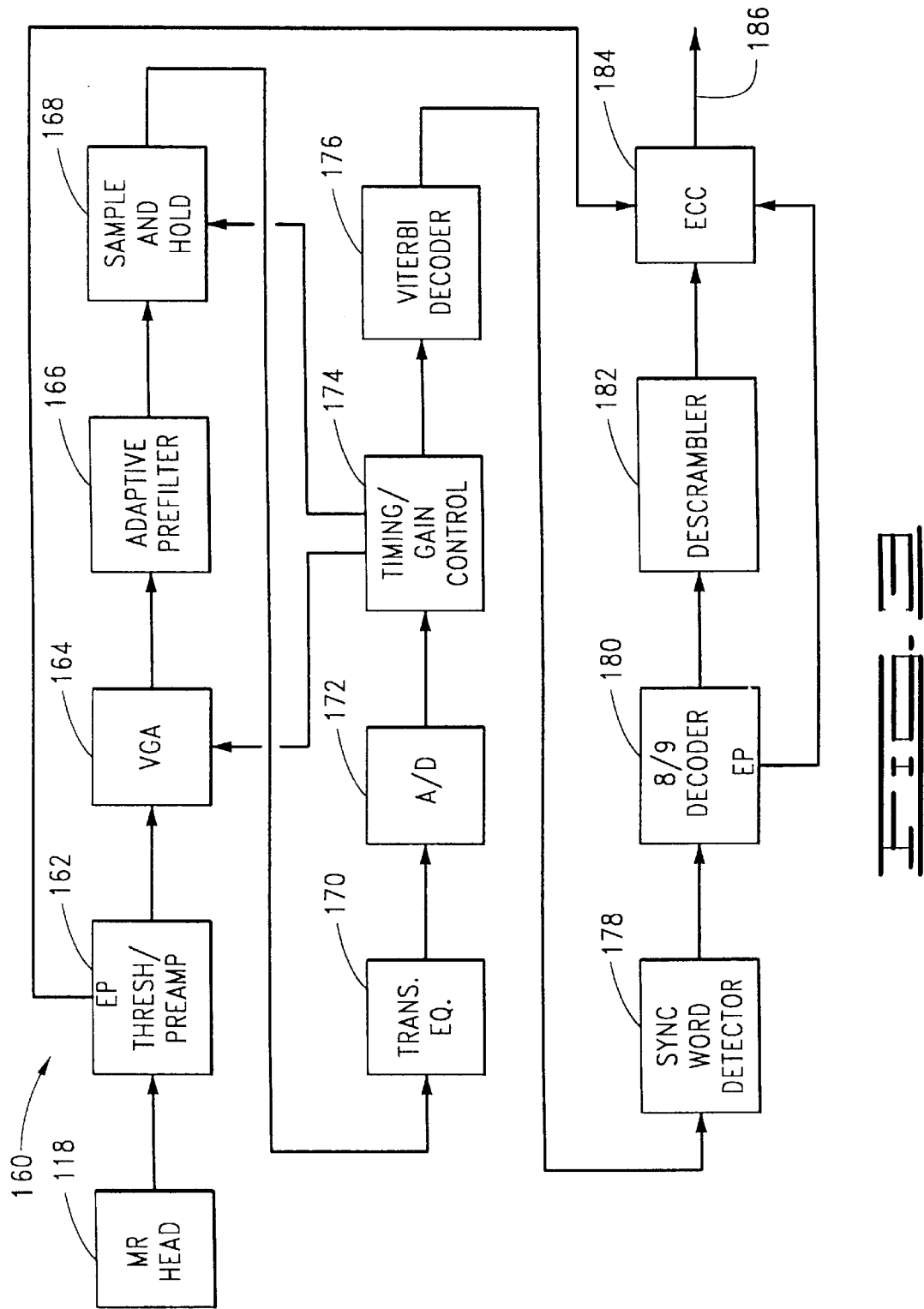

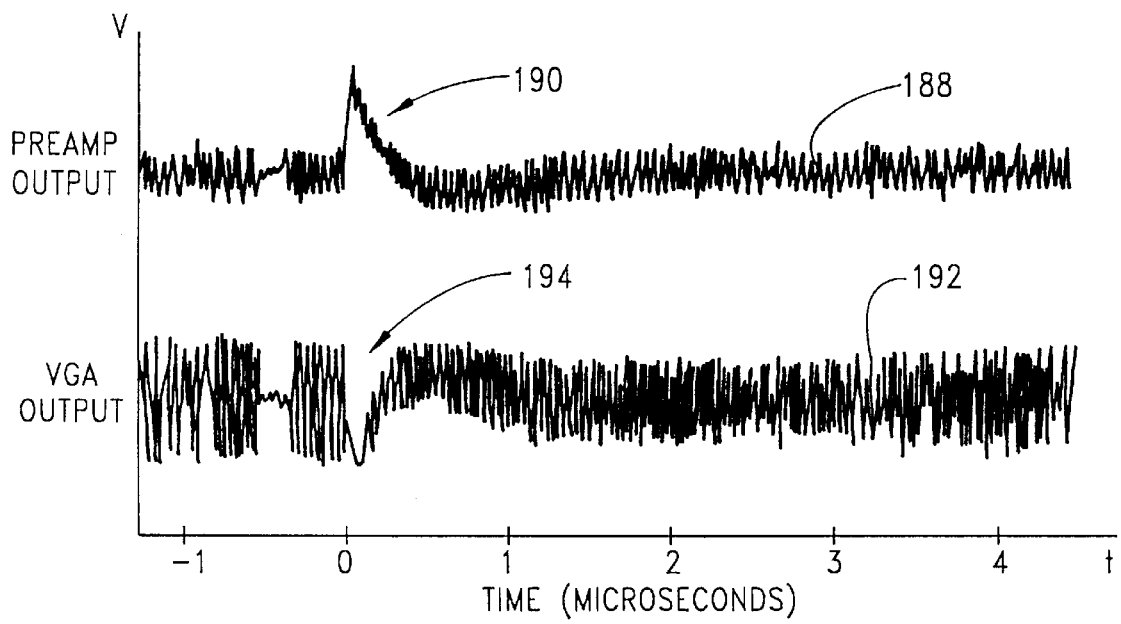
FIG-4
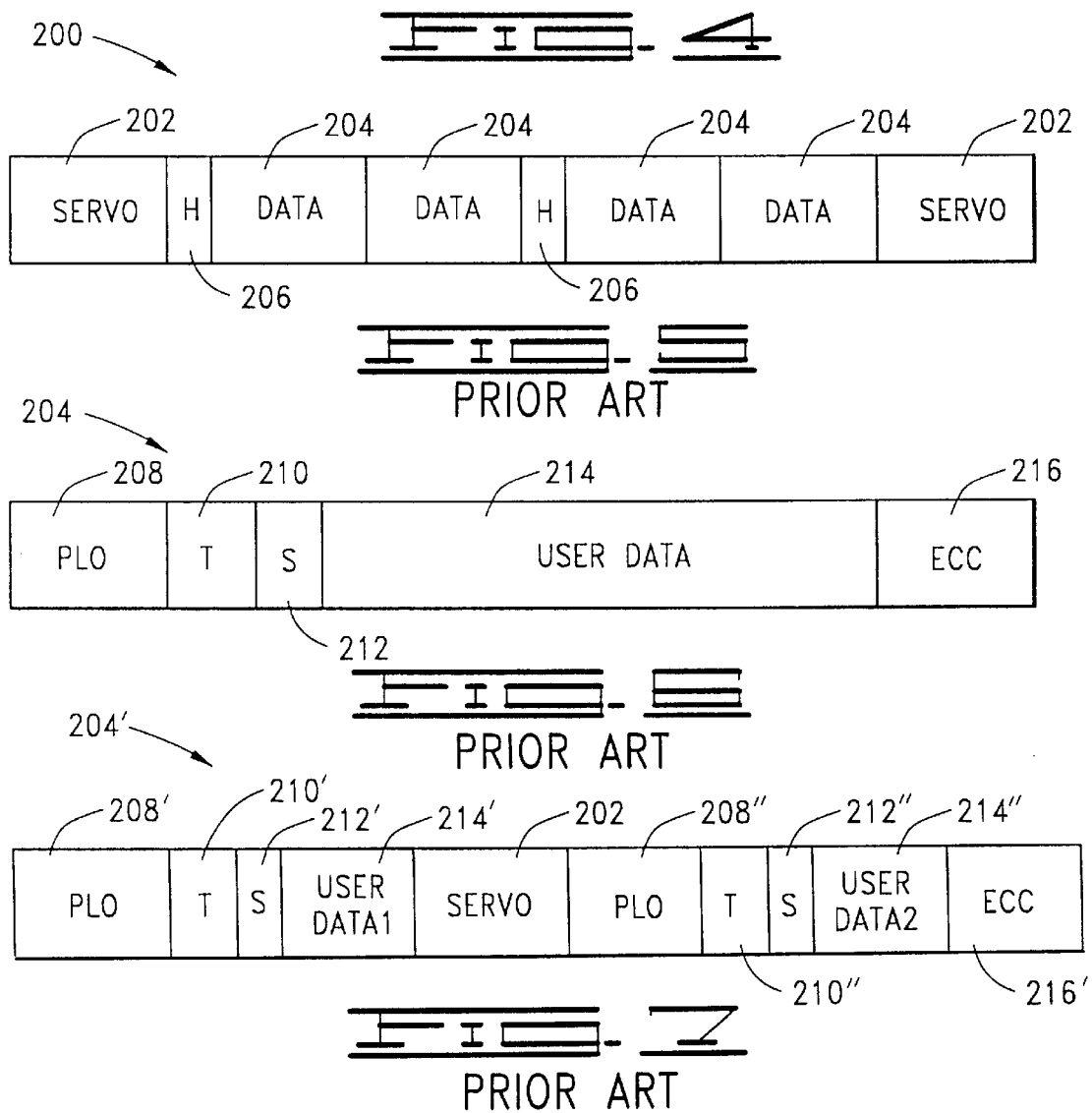
FIG-5 PRIOR ART
FIG-6 PRIOR ART
FIG-7 PRIOR ART

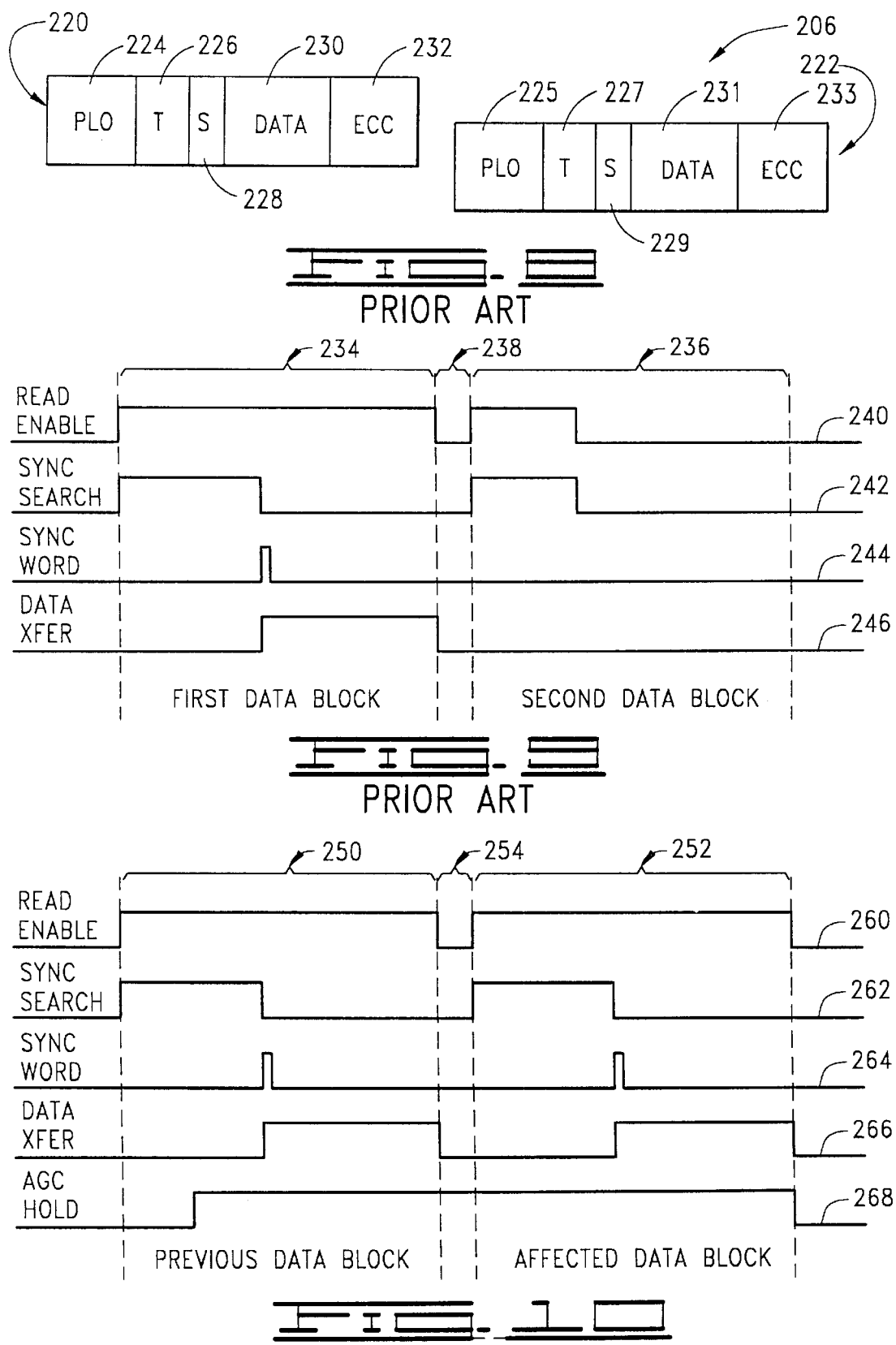

HOLDING AUTOMATIC GAIN CONTROL LEVELS DURING READ ERROR RECOVERY IN A DISC DRIVE

CROSS-REFERENCE TO RELATED APPLICATIONS

This application claims priority to U.S. Provisional Application No. 60/037,629 filed Jan. 15, 1997.

FIELD OF THE INVENTION

The present invention relates generally to the field of disc drive devices and more particularly, but without limitation, to recovering user data from a disc drive data block affected by an anomalous condition, such as a thermal asperity, through the reading of a preceding block to set an automatic gain control level and then holding the level during the successive reading of the affected data block.

BACKGROUND

Data storage devices of the type known as "Winchester" or "hard" disc drives are typically provided with a plurality of rigid discs that are coated with a magnetizable medium and mounted on the hub of a spindle motor for rotation at a constant high speed. A controllably positionable actuator is disposed adjacent the discs, the actuator including a plurality of heads which are used during write and read operations to magnetically store and retrieve user data from tracks defined on the disc surfaces.

A closed loop servo system is used to control the position of the heads with respect to the tracks on the disc. More particularly, the actuator typically includes a coil of a voice coil motor (VCM) so that currents applied to the coil by the servo system cause the heads to move relative to the tracks in a controlled manner. A read/write channel, responsive to the heads, cooperates with an interface circuit to control the transfer of user data between the discs and a host computer in which the disc drive is mounted.

As will be recognized, consumer demand for ever increasing disc drive storage capacities and data transfer rates have led to continual advances in the disc drive art. One such advancement is the increasingly common use of magnetoresistive (MR) heads, each of which typically includes an MR element having a changed electrical resistance in the presence of a magnetic field of a particular orientation. Thus, during a disc drive read operation a bias current is passed through the MR element and the data stored on the corresponding track is detected as a function of changes in voltage across the MR element.

It will be recognized that increased storage capacities can be further achieved through the flying of the heads of a disc drive closer to the surfaces of the discs; however, a resulting problem is that the heads will occasionally contact the discs at high points on the disc (or the heads will contact contaminating particles disposed on the disc). Because of the sensitivity of an MR head, such contact will lead to a sudden increase in temperature of the head, distorting the readback signal for several microseconds. Such an anomalous condition is commonly referred to as a thermal asperity and will cause the readback signal to have a sudden increase in amplitude, followed by a longer falling edge due to the relatively large heat dissipation time constant of the MR head.

A typical read channel employs a variable gain amplifier (VGA) having an automatic gain control stage (commonly referred to as an "AGC") which continuously monitors and amplifies the readback signal to a level sufficient for processing by the rest of the read channel. Thus, a thermal asperity can cause the AGC to react by undesirably adjusting the gain of the VGA, introducing a gain error in the VGA of sufficient duration to prevent subsequent detection of timing information or user data by the read channel before the gain error can be corrected. This effect is particularly pronounced where the AGC has a relatively fast response to a signal amplitude above a target value and a slower response to a signal below the target value, so that the AGC responds to peak signal amplitude rather than average signal amplitude.

Accordingly, there is a continual need for improvements in the art whereby user data can be reliably recovered from a disc drive in the presence of anomalous conditions such as thermal asperities which tend to prevent the disc drive from properly detecting and retrieving the user data.

SUMMARY OF THE INVENTION

The present invention provides a method and apparatus for recovering user data from a disc drive. Generally, the disc drive comprises a rotatable disc in which the user data are stored and retrieved by way of a plurality of blocks arranged on tracks of the disc, the blocks including data blocks in which the user data are stored in predefined increments. A head is used to generate readback signals as the blocks pass proximate to the head and a read channel, responsive to the head, reconstructs the user data from the readback signals. The read channel comprises an automatic gain control stage which establishes a gain used in the amplification of the readback signals to a range suitable for use by the read channel.

Accordingly, in accordance with the preferred embodiment of the present invention, after that a data block on a selected track is determined to be affected by an anomalous condition such that one or more uncorrected read errors are obtained as the affected data block is read, the disc drive will perform a dual block read error recovery operation wherein the disc drive will read a previous block on the selected track sequentially preceding the affected data block. As the previous block is read, the gain established by the automatic gain control stage will be set to a fixed value in response to the readback signals obtained from at least a portion of the previous block. Subsequently, the disc drive will read the affected data block using the fixed value of the gain from the previous block in order to recover the user data from the affected data block.

Moreover, depending upon the configuration of the disc drive, the previous block can be a data block or a header block immediately preceding the affected data block. Further, a servo block comprising prerecorded servo information used by a servo control circuit of the disc drive to control the position of the head with respect to the tracks can be disposed between the previous block and the affected data block.

These and various other features as well as advantages which characterize the present invention will be apparent from a reading of the following detailed description and a review of the associated drawings.

BRIEF DESCRIPTION OF THE DRAWINGS

FIG. 1 is a disc drive constructed in accordance with the preferred embodiment of the present invention.

FIG. 2 provides a functional block diagram of the disc drive of FIG. 1 operably connected to a host computer in which the disc drive is mounted.

FIG. 3 provides a functional block diagram of the read channel portion of the read/write channel shown in FIG. 2.

FIG. 4 illustrates typical output signals from the preamp and variable gain amplifier circuits of FIG. 3 in response to the occurrence of a thermal asperity.

FIG. 5 provides a representation of a portion of one of the tracks of the disc drive of FIG. 1, FIG. 5 showing the arrangement of servo, data and header blocks in a prior art configuration referred to as a "header fewer format."

FIG. 6 shows one of the prior art data blocks of FIG. 5 in great detail.

FIG. 7 shows one of the prior art data blocks such as generally illustrated in FIG. 5 which has been split due to the coincidental placement of one of the servo blocks of FIG. 5 in a manner that is known in the art.

FIG. 8 shows one of the prior art header blocks of FIG. 5 in greater detail.

FIG. 9 provides a timing diagram illustrating various windows established by the sequencer portion of the interface circuit of FIG. 2 during a conventional read operation of the disc drive of FIG. 1 upon two successively disposed data blocks, such as illustrated in FIGS. 5 and 6.

FIG. 10 provides a timing diagram illustrating the manner in which the preferred embodiment of the present invention operates to establish and hold the gain of the automatic gain control stage of the variable gain amplifier of FIG. 3 during the reading of a previous data block in order to recover the user data from a subsequent data block affected by a read error condition.

DETAILED DESCRIPTION

Figure 11:
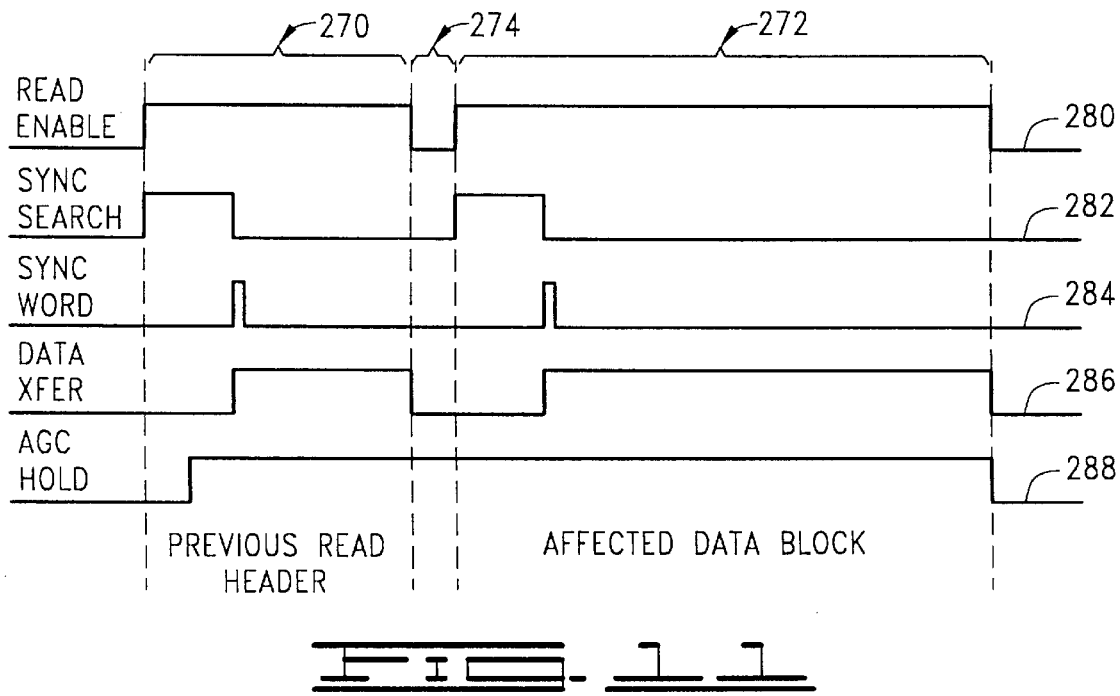
FIG. 11 provides a timing diagram illustrating the manner in which the preferred embodiment of the present invention operates to establish and hold the gain during the reading of a previous header block sequentially preceding an affected data block.

Turning now to the drawings and more particularly to FIG. 1, shown therein is a top plan view of a disc drive 100 constructed in accordance with the preferred embodiment of the present invention. The disc drive 100 includes a base deck 102 to which various disc drive components are mounted and a top cover 104, which is shown in a partial cut-away fashion to expose selected components of interest. Although not explicitly illustrated in the top plan view of FIG. 1, it will be readily understood that the base deck 102 cooperates with the top cover 104 to provide an internal, sealed environment for the disc drive 100.

Mounted to the base deck 102 is a spindle motor (shown generally at 106) to which a plurality of discs 108 are mounted for rotation at a constant high speed. Adjacent the discs 108 is an actuator assembly 110 which pivots about a cartridge bearing assembly 112 in a rotary fashion. The actuator assembly 110 includes actuator arms 114 which support flexures 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. A latching arrangement (a pin of which is shown at 122) is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up therein which interacts with the magnetic circuit of the VCM 124, causing the actuator assembly 110 to pivot about the cartridge bearing assembly 112 and the heads 118 to move across the surfaces of the discs.

To provide the requisite electrical conduction paths between the heads 118 and disc drive read/write circuitry (not shown in FIG. 1), head wires (not separately shown) are routed on the actuator assembly 110 from the heads 118, along the flexures 116 and the actuator arms 114 to a flex circuit assembly 130. Particularly, the head wires are secured to corresponding pads of a flex circuit board 132 which is connected to a flex 134 which terminates at a flex circuit bracket 136. The flex circuit assembly 130 facilitates communication between the actuator assembly 110 and a printed circuit board (PCB) mounted to the underside of the disc drive 100 (not shown).

FIG. 2 provides a general functional block diagram of the disc drive 100 of FIG. 1, operably connected to a host computer 140. As shown in FIG. 2, the disc drive 100 generally comprises a spindle control circuit 142, a servo control circuit 144 and a read/write channel 146, all of which are in communication with and controlled by a system processor 150. An interface circuit 152 is shown connected to the read/write channel 146 and to the system microprocessor 150, with the interface circuit 152 serving as a conventional data interface and buffer for the disc drive. The interface circuit 152 includes a sequencer (not separately shown) which comprises hardware used to establish varying timing sequences during the operation of the read/write channel 146, as described in greater detail below.

As will be recognized, the spindle control circuit 142 controls the rotational speed of the spindle motor 106 (FIG. 1) in a conventional manner. For additional discussion regarding spindle control circuits, see U.S. Pat. No. 5,631, 999 issued May 20, 1997 to Dinsmore, assigned to the assignee of the present invention.

The servo control circuit 144 of FIG. 2 is shown to receive servo position information from the head 118 and, in response thereto, provides a correction signal to the actuator coil 126 in order to position the head 118 with respect to the disc 108 (FIG. 1). For additional discussion regarding typical digital servo systems such as the servo control circuit 144, see U.S. Pat. No. 5,262,907 issued Nov. 16, 1993 to Duffy et al., as well as U.S. Pat. No. 5,136,439 issued Aug. 4, 1992 to Weispfenning et al., both of these references being assigned to the assignee of the present invention.

The read/write channel 146 operates to write data to the disc 108 in response to user data provided to the channel from the interface circuit 152 by encoding and serializing the data and generating a write current utilized by the head 108 to selectively magnetize portions of a selected track on the disc 108. Correspondingly, the previously stored data are retrieved by the read/write channel 146 by reconstructing the data from the read signals generated by the head 118 as the head passes over the selected track on the disc 108.

It will be noted that the various operations of the disc drive 100 are controlled by the system microprocessor 150 in accordance with programming stored in system microprocessor memory (MEM) 154. Those skilled in the art will recognize that typical disc drives include additional circuitry and functions beyond those delineated above, but such are only of general interest to the present discussion and accordingly do not warrant further description herein.

Referring now to FIG. 3, shown therein is a functional block diagram of a read channel 160 of the disc drive 100, the read channel 160 constituting the readback portion of the read/write channel 146 of FIG. 2. The read channel 160 employs partial response, maximum likelihood (PRML) signal processing, which as will be recognized involves time-domain equalization and self-synchronization of the read signal provided by the head 118. PRML read channel implementations are discussed, for example, in U.S. Pat. No. 5,422,760, issued Jun. 6, 1995 to Abbott et al., U.S. Pat. No. 5,459,757 issued Oct. 17, 1995 to Minuhin et al. and U.S. Pat. No. 5,592,340 issued Jan. 7, 1997 to Minuhin et al.

Continuing with FIG. 3, the read channel 160 is shown to comprise a threshold detector and preamp circuit 162 (hereinafter also referred to as "preamp") which operates to monitor the variations in the read voltage sensed across the MR element of the head 118, which is identified in FIG. 3 as an MR head. The preamp 162 provides threshold detection, preamplification and frequency domain filtering of the signal provided by the head 118. Particularly, the preamp 162 senses when the readback signal exceeds a predetermined threshold which is useful in detecting the occurrence of a thermal asperity.

The output signal from the preamp 162 is provided to a variable gain amplifier (VGA) 164, which includes an automatic gain control stage (referred to herein as "AGC") to maintain a nominal signal amplitude for the remainder of the read channel 160. The AGC operates at such time that the read channel 160 is enabled and sets the gain in response to the input signal level from the preamp 162. As will be recognized, the AGC first operates in an "acquisition" mode during which large adjustments in the gain are made in response to the initial signal levels provided by the preamp 162 to provide a coarse adjustment of the gain. The AGC then transitions into a "fine adjustment" mode, during which the AGC normally continues to provide small, incremental adjustments to the gain as long as the read channel 160 is enabled as a particular sector is read. Such operation is intended to maintain the gain of the output signal from the VGA 164 at levels suitable for subsequent decoding by the rest of the read channel 160. However, as will be discussed in greater detail below it is contemplated that the gain will be held at a constant value during portions of the time during which the read channel 160 is enabled in order to enhance the ability of the read channel 160 to recover user data from the discs 108 during a read error recovery mode of operation of the disc drive 100.

Continuing with FIG. 3, the output signal from the VGA 164 is prefiltered by an adaptive prefilter 166 which generally operates as a low pass filter to remove higher frequency noise components from the signal. The frequency domain filtering characteristics of the adaptive prefilter 166 can be readily controlled through the use of control inputs (not shown) provided by, for example, the system processor 150.

The filtered output of the adaptive prefilter 166 is provided to a sample and hold circuit 168, which as will be recognized provides a series of discrete analog values in response to the input signal received by the circuit. These discrete analog values are then provided to a transversal equalizer 170, which provides time domain equalization of the readback signal, filtering the signal to a close approximation of a selected class of PRML signaling (in this case PR-4).

The output of the transversal equalizer 170 is sampled (digitized) by an analog to digital (A/D) converter 172, and these samples are used by a timing and gain control circuit 174 to adjust the gain of the VGA 164. The timing and gain control circuit 174 further provides timing inputs to the sample and hold circuit 168 and a phase-locked loop (not separately shown) used by a Viterbi decoder 176 to decode read data from the samples obtained from the transversal equalizer 170.

The output from the Viterbi decoder 176, comprising a digitally expressed data sequence corresponding to the encoded data originally written to the selected track, is provided to a sync word detector 178 which, when enabled by the sequencer of the interface circuit 152, proceeds to examine each successive set of bits in the output data sequence for a unique pattern which enables the read channel 160 to synchronize with the user data. This unique pattern, or sync word, provides an indication that the following bits in the sequence are user data to be retrieved to the host. When found, the sync word is output by the sync word detector 178 to the sequencer.

After passing through the sync word detector 178, the data sequence is then provided to an 8/9 decoder 180, which converts each set of 9 bits stored to the disc 108 back to the original 8 bits of input data to remove the RLL encoding used to ensure reliable timing during the read recovery process. Although 8/9 encoding has been disclosed, it will be understood that other encoding rates can readily be utilized, such as 16/17. The output from the 8/9 decoder 178, which is typically characterized as a series of n-bit words, or symbols, is provided to a descrambler 182, which performs a selected logical operation upon each symbol using a set of descrambling words (or "keys") that rotate through a known sequence.

The output sequence from the descrambler 182 is then provided to an error correction code (ECC) circuit 184, which performs error detection and correction upon the received sequence (using, for example Reed-Solomon codes) and, if no uncorrectable errors are present, outputs user data on signal path 186 to the interface circuit 152 (FIG. 2) for subsequent transfer to the host computer 140. Although in practice the ECC circuit 184 is often incorporated as part of the interface circuit 152 (FIG. 2), to more conveniently facilitate the present discussion the ECC circuit 184 has been identified as the last stage of the read/write circuit 184 in FIG. 3.

As discussed in greater detail in U.S. Pat. No. 5,627,843 issued May 6, 1997 to Deng et al. and U.S. Pat. No. 5,276,662 issued Jan. 4, 1994 to Shaver et al., both of which are assigned to the assignee of the present invention, ECC encoding is initially performed by the write channel portion of the read/write channel 146 by appending a number of code symbols to the end of each selected portion of data symbols to generate encoded words (or interleaves) that mathematically map into a Galois field. When an encoded word is retrieved, the word is compared to the set of defined combinations, so that encoded words containing read errors will generally not map into the set of defined combinations; thus, based upon the algorithm used by the ECC circuitry, illegal combinations can be detected and up to a selected number of the data symbols in such words can be changed in order to correct the presence of read errors therein. Once the data have been corrected, the code bits are stripped, allowing the originally recorded data to be output by the ECC circuit 184 to the interface circuit 152 and then on to the host computer 140.

The ECC circuit 184 has the capability of correcting up to a maximum of t erroneous data symbols and 2t erasures, with an erasure comprising a particular data symbol suspected as containing an error as indicated by other portions of the read channel during normal operation (such as the preamp 162 and the 8/9 decoder 180). As disc drives typically store 512 bytes of data per sector (data block) on the discs and typically employ Reed-Solomon encoding schemes using one code symbol for (up to) 255 bytes of data, each sector of data will typically have three to four code symbols for the data symbols stored in the sector. Accordingly, the ECC circuit 184 preferably can correct up to four errors in the data symbols associated with each code symbol (i.e., t=4) and can alternatively correct up to eight erasures in the data symbols for each code symbol (i.e., 2t=8). Hence, for a data block having four code words, up to 16 errors or up to 32 erasures can be corrected by the ECC circuit 184 in the data stored in the sector.

Having concluded an overview of the disc drive 100 with respect to FIGS. 1 through 3, reference is now made to FIG. 4, which provides a graphical representation of the signal (voltage) outputs from the preamp 162 and the VGA 164 in the presence of a thermal asperity. More particularly, FIG. 4 provides a preamp output signal 188, with a thermal asperity portion 190 corresponding to a thermal asperity contemplated as occurring at time t=0, as indicated along the x-axis of the graph of FIG. 4. The characteristic rapid rise time and gradual decay of the thermal asperity can be readily seen from the thermal asperity portion 190.

FIG. 4 further provides a corresponding VGA output signal 192 generated in response to the preamp output signal 188. As shown in FIG. 4, in response to the thermal asperity portion 190 of the preamp output signal 188 the AGC quickly drops the gain at a correction portion 194, introducing significant gain error into the VGA output signal 192 which takes several microseconds to correct, as indicated along the x-axis of the graph. As will be discussed below, the preferred embodiment of the present invention operates so as to minimize the effects of such thermal asperities on the operation of the disc drive 100; however, it will be helpful to first briefly discuss the format of the various tracks on the discs 108 and FIGS. 5–8 have been provided for this purpose.

Referring now to FIG. 5, shown therein is a portion of a track 200 of the disc 108 of FIGS. 1 and 2 showing various blocks arranged in a well known configuration sometimes referred to as "header fewer format". That is, the track 200 is shown to include servo blocks 202, data blocks 204 and header blocks 206 ("H"), with one header block 206 being provided for each pair of successive data blocks 204, as shown. It will be recognized that although the header fewer format has been disclosed herein for purposes of disclosure, it will be readily apparent that such is not limiting and other configurations, such as a "headerless format", can readily be utilized in accordance with the claimed invention. Moreover, it will be recognized that there will be small gaps between successive blocks on each of the tracks 200, but for purposes of clarity these gaps are not shown in FIG. 5.

Beginning with the servo blocks 202 of FIG. 5, it will be recognized that these blocks comprise servo information used by the servo control circuit 144 (FIG. 2) during positional control of the heads 118 with respect to the discs 108. The servo blocks 202 are written during disc drive manufacturing and are generally radially spaced on the surfaces of the discs 108, like spokes of a wheel.

The data blocks 204 are written during disc drive write operations and are used primarily for the storage and retrieval of user data. For reference, the data blocks 204 are also sometimes referred to as "data fields" or "sectors". FIG. 6 provides a representation of one of the data blocks 204 of FIG. 5 in greater detail.

As shown in FIG. 6, the data block 204 begins with a phase locked oscillator (PLO) field 208, which comprises a 2T or other oscillating pattern which, when read, enables the read channel 160 (FIG. 3) to acquire the necessary timing and amplitude information for the subsequent reading of the user data stored in the data block 204. Following the PLO field 208 is a training field 210 (T) and a sync field 212 (S).

The training field 210 generally comprises a series of randomized data that enables the read channel to further optimize the tap weights used by the transversal equalizer 170 (FIG. 3). The sync field 212 provides timing information in the form of a "sync word" which identifies the beginning of the user data, the user data being stored in a user data field 214 immediately following the sync field 212. Thus, the sync word enables the read channel 160 to obtain frame lock so that the read channel 160 is ready to begin receipt of the user data from the user data field 214 at the appropriate time.

Finally, an ECC code field 216 is appended at the end of the user data field 214, the ECC code field 216 having the code symbols used by the ECC circuitry 180 (FIG. 3) to perform error detection and correction upon the data symbols read from the user data field 214. As will be recognized, the PLO field 206, the training field 210 and the sync field 212 are written by the head 118 during the same write operation that results in the writing of the user data and associated ECC code symbols to the user data and ECC code fields 214, 216, respectively.

As provided above, the data blocks 204 are generally contiguous in embedded servo systems; that is, as illustrated in FIG. 5, most of the data fields 204 will wholly reside within the user data area between successive servo fields 202. However, to optimize data storage capabilities it has become increasingly common to split selected data blocks 204 at locations where the servo fields 202 occur; such a configuration will now be briefly discussed with reference to FIG. 7.

More particularly, FIG. 7 illustrates a non-contiguous data block 204' having a user data field which would otherwise be coincident with one of the servo fields 202. Thus, the user data field is split into two portions (a first user data field 214' and a second user data field 214"), the respective lengths of which are dependent upon the relative location of the servo field 202.

Accordingly, the data block 204' has a first set of control fields (PLO field 208', training field 210 and sync field 212') to enable the read channel to recover the user data in the first user data field 214'. After the servo field 202, a second set of control fields are provided (comprising a second PLO field 208", second training field 210" and a second sync field 212") which allow access to the remaining user data stored in the second user data field 214". The code words associated with the user data are stored in a ECC code field 216' following the second user data field 214" as shown.

Referring now to FIG. 8, shown therein is a general representation of one of the headers 206 of FIG. 4. As will be recognized, the headers 206 are used to provide logical address and status information for the associated data blocks 204. As shown in FIG. 8, the header 206 comprises a write header portion 220 and a read header portion 222 which are typically radially offset as shown to account for slight differences in location within the head 118 between the MR element used during read operations and an inductive write element used during write operations. The write and read header portions 220, 222 are typically written when the disc drive 100 is formatted and may be updated during subsequent operations of the disc drive 100. In headerless formats, headers are not used and the status and logical address information for the data blocks 204 is stored in memory such as the MEM 154 of FIG. 2.

It will be recognized that the overall configurations of the write and read header portions 220, 222 are generally similar to that of the data blocks 204, in that PLO fields 224, 225, training fields 226, 227, sync fields 228, 229 data fields 230, 231 and ECC code fields 232, 233 are provided as shown. Instead of user data, however, the data fields 230, 231 store the logical address and status information relating to the associated data fields 204.

Having concluded the discussion of the various blocks 202, 204, 206 of the track 200 as set forth in FIGS. 5–8, the manner in which successive data blocks 204 are read by the disc drive 100 during a read operation will now be discussed with reference to FIG. 9. Particularly, FIG. 9 provides a timing diagram generally representative of timing windows established by the sequencer 152 (FIG. 2) during the read operation upon two successive contiguous data blocks (such as 204 as shown in FIG. 5). For clarity, the data blocks are identified as a "first data block" and a "second data block" in FIG. 9, having respective durations identified at 234 and 236. A small gap 238 is disposed between the first and second data blocks, as shown. Moreover, as explained below it is contemplated that a thermal asperity, the effects of which have been previously illustrated in FIG. 4, will prevent the retrieval of the user data stored in the second data block. For reference, FIG. 9 has been identified as prior art because the disc drive 100 preferably performs this initial read operation in a conventional, known manner.

As is known in the art, at the beginning of a read operation during which the user data stored in the first and second data are to be retrieved, the associated head is moved to the selected track 200 and the sequencer waits until the first data block passes under the head. At such point, the sequencer opens a read window (also sometimes referred to as a "read gate" or "read enable"), as shown by a READ ENABLE line 240 in FIG. 9. The read window nominally defines a period of time during which the read channel is enabled to read the data block. Also at this point, a sync word search window is opened for a selected period of time, as shown by a SYNC SEARCH line 242 in FIG. 9, during which the sync word detector 178 (FIG. 3) searches for the appropriate sync word in the data sequence passed therethrough; the sync word will normally be generated as the head reads the sync field 212. As the read channel has been enabled, the receipt of the PLO and training information from the PLO and training fields (208, 210 of FIG. 6) operably tune the read channel in preparation of receipt of the user data in the user data field 214 (FIG. 6).

When the sync word is properly detected by the sync word detector 178, a corresponding sync signal is output to the interface circuit 152 (FIG. 2) as indicated by a SYNC WORD line 244, and data transfer from the user data field 214 is initiated during a data transfer window as indicated by a DATA XFER line 246. Thus, at such time that the DATA XFER line is active the disc drive 100 recovers the user data from the data block, performs on-the-fly error detection and correction and, if no uncorrected errors remain, transfers the user data to the host computer 140. Once the read operation upon the first data block is completed, the read and data transfer windows (as indicated by the READ ENABLE and DATA XFER lines 240, 246) are temporarily closed.

The head 118 continues until the second data block in FIG. 9 is reached, after which a read window and a sync word search window are again opened (as indicated by the READ ENABLE and SYNC SEARCH lines 240, 242). However, the second data block is contemplated as being adversely affected by a thermal asperity so that the user data are not recovered from the second data block during this normal read operation. Particularly, the thermal asperity is contemplated as occurring either towards the end of the first data block or during the initial stages of the second data block and causes the AGC to introduce a gain error into the read channel 160 so that the sync word detector fails to properly decode the sync word from the sync field of the second data block (212 in FIG. 6). Accordingly, the read and sync word search windows time out without the outputting of a sync signal for the second data block, preventing the transfer of the user data from the second data block as shown.

In accordance with the preferred embodiment, at such time that the user data are not recovered from the second data block of FIG. 9, the disc drive 100 enters a read error recovery operation during which the disc drive 100 attempts to recover the user data from the second data block applying one or more corrective actions which are generally known in the art. As discussed below, however, at some point during the read error recovery operation the disc drive 100 will initiate an error recovery phase in accordance with the preferred embodiment of the present invention and which is generally illustrated as follows, beginning with FIG. 10.

Referring now to FIG. 10, shown therein is a timing diagram illustrating the read error recovery operation upon two adjacent data blocks identified therein as an "affected data block", which corresponds to the second data block of FIG. 9 and exhibits the error condition that initiated the error recovery operation; and a "previous data block", which corresponds to the first data block of FIG. 9 and is the data block physically preceding the affected data block on the track 200. The previous and affected data blocks have corresponding durations as shown at 250 and 252 and are separated by a small gap (indicated in FIG. 10 at 254).

In a manner similar to that of a normal read operation such as illustrated in FIG. 9, FIG. 10 shows the opening of a read window and a sync word search window at such time that the previous data block reaches the head 118, as indicated by a READ ENABLE line 260 and a SYNC SEARCH line 262. When the sync word is properly detected by the sync word detector 178, the corresponding sync signal is output as shown by a SYNC WORD line 264, after which the user data from the previous data block are retrieved during the period of time shown by a DATA XFER line 266. However, as this is a read error recovery operation intended to recover the user data from the affected data block, the user data from the previous data block is not ultimately transferred to the host 140 (FIG. 2) and so is therefore discarded by the sequencer portion of the interface circuit 152 (FIG. 2).

The purpose for reading the previous data block is thus not to ultimately recover the user data therefrom, but rather to set the gain of the AGC (of the VGA 164 of FIG. 3) to a level suitable for use during the recovery of the user data from the following affected data block. As illustrated in FIG. 10, the gain of the AGC is acquired during initial portions of the previous data block and then held at a constant value throughout the remainder of the read operation upon the previous data block and on through the completion of the reading of the affected data block, shown by an AGC HOLD line 268. As will be recognized, the AGC can be held to an existing value in response to commands provided to the VGA 164 by, for example, the sequencer.

In the case illustrated in FIG. 10, the AGC is held after receipt of the control information provided by the PLO field 208, which is provided for the very purpose of allowing various control parameters within the read channel 160 to be established in accordance with the foregoing description. Thus, the PLO information will provide sufficient information to allow the AGC to acquire the gain to a suitable level (although as discussed below the point at which the gain is initially held can be moved to a position later within the previous data block). As it is clear that some sort of anomalous event has prevented the recovery of the user data from the affected data block, setting the gain of the AGC by way of the previous data block and holding this gain throughout the subsequent reading of the affected data block will generally enhance the ability of the read channel 160 to recover the user data therefrom, especially if a thermal asperity event such as illustrated in FIG. 4 caused the read error condition associated with the affected data block.

Hence, continuing with FIG. 10 the read channel 160 will proceed with a read operation upon the affected data block using the AGC gain value determined by the previous data block. More particularly, the READ ENABLE line 260 will go high, enabling the read channel to acquire the control information from the PLO and training fields 208, 210 (FIG. 6) and a search will be performed for the sync word as indicated by the SYNC SEARCH line 262. As a result of the holding of the AGC gain, the read channel 160 will have an increased likelihood of successfully detecting the sync word, as indicated by the SYNC WORD line 264. Successful decoding and transfer of the user data will therefore likely occur as indicated by the DATA XFER line 266. Thereafter, the disc drive 100 will exit the read error recovery mode of operation and resume normal read operation on subsequent data blocks in a conventional manner.

The operation of the disc drive 100 to recover the user data from an affected data block having a data block immediately preceding the affected data block has been shown in FIG. 10 and would be the preferred approach for disc drives utilizing a headerless format and for disc drives utilizing a header fewer format when the affected data block immediately follows a previous data block, such as illustrated for certain of the data blocks 204 in FIG. 5. However, the header 206 can also be used to set the gain of the AGC, as illustrated in FIG. 11.

Referring to FIG. 11, and with reference back to FIG. 8, the read header portion 222 will be radially aligned with the data block 204; hence, for those cases wherein the affected data block immediately follows a header 206, the read header portion 222 can be used to set the gain for the subsequent reading of the affected data block. As shown in FIG. 11, the previous read header and the following affected data block have corresponding durations of 270 and 272 and are separated by a small gap 274. During the read error recovery operation invoked to recover the user data from the affected data block, the read channel 160 will read the read header portion as shown, establishing read and sync word search windows as evidenced by READ ENABLE and SYNC SEARCH lines 280, 282. As before, the sync word will be detected and the corresponding sync signal will be output as indicated by SYNC WORD line 284. The contents of the read header will then be recovered during a data transfer window indicated by DATA XFER line 286. Finally, the gain of the AGC will be acquired and held during remaining portions of the read header portion and through the remaining read operation upon the affected data block, as shown by AGC HOLD line 288.

The read error recovery operations as described in FIGS. 10 and 11 will generally cover most of the situations wherein the preferred embodiment can be advantageously implemented, but it will be recognized that it may be desirable to recover from an uncorrected read error condition in a data block 204 that immediately follows a servo block 202. Also, the affected data block might itself be split by a servo block 202, as shown in FIG. 7. Hence, FIG. 12 has been provided illustrating the situation when the previous data block (or portion thereof) from which the AGC gain will be established is physically separated from the affected data block (or portion thereof) by a servo block 202. For reference, the previous data block, servo block and affected data blocks have corresponding durations in FIG. 12 of 290, 292 and 294, with gaps disposed therebetween at 296 and 298. Of course, as in all of the figures the actual lengths and corresponding durations of the various blocks 202, 204 and 206 (FIG. 5) will be different than the relative lengths and durations shown, depending upon a given configuration.

Figure 12:
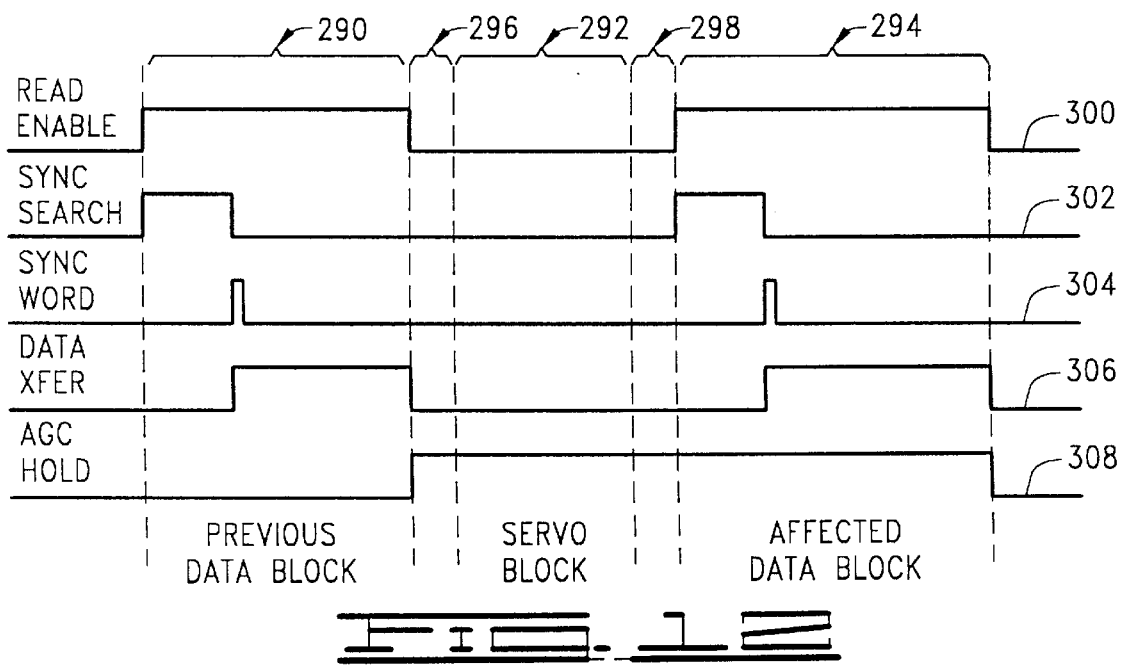
FIG. 12 provides a timing diagram illustrating the manner in which the preferred embodiment of the present invention operates to hold the gain during the reading of a previous data block when a servo block is disposed between the previous data block and the affected data block.

Continuing with FIG. 12, the read channel 160 is enabled during passage of the previous data block and the affected data block, as shown by READ ENABLE line 300 and associated search windows are established as shown by SYNC SEARCH line 302, in a manner as previously described, except that the read channel 160 is temporarily disabled during the duration of the servo block 292 during which the read signals generated by the head 118 are directed to the servo control circuit 144. The outputting of the sync signals upon successful detection of the sync words is shown by SYNC WORD line 304 and data transfer immediately follows during periods defined by DATA XFER line 306. Also, the AGC gain is established during the previous data block and this value is held through the completion of the affected data block, as indicated by HOLD AGC line 308.

Unlike the previous examples of FIGS. 10 and 11, however, the AGC gain is shown to be held at the end of the previous data block in FIG. 12. Although the point at which the AGC is held during the reading of the previous data (or header) block is variable and can be selected based on a variety of considerations, it will be noted that it is desirable to not hold the AGC too long beyond a point at which drifting of the gain will introduce sufficient error to adversely affect the reading of the affected data block. In some disc drives, the size of the data blocks is user selectable and can range, for example, from 128 bytes to 4096 bytes. Accordingly, the gain drift error after holding the gain over two relatively long data blocks may become too great to ensure reliable reading by the time the end of the affected data block is reached. The length of the gaps between adjacent blocks, if relatively large, can also adversely affect the ability of the read channel 160 to recover the data due to gain drift error.

On the other hand, it is not generally desirable to initiate the holding of the gain too close to the beginning of the affected sector. This is because the read error recovery operation of the preferred embodiment is not initiated until a read error condition has already been identified with the affected data block; if this read error condition has been caused by a thermal asperity (which the disc drive 100 may be able to further discern as described above), the thermal asperity may have arisen either during the initial portions of the affected data block, or during the last portions of the previous data block. Accordingly, setting and holding the gain at the very end of the previous data block might actually make things worse during the reading of the immediately following affected data block, if the gain is held at a time when a large amount of gain error has been introduced due to a thermal asperity. It is contemplated that the requirements of a given application will help establish the optimum timing points for the holding of the AGC gain.

Figure 13:
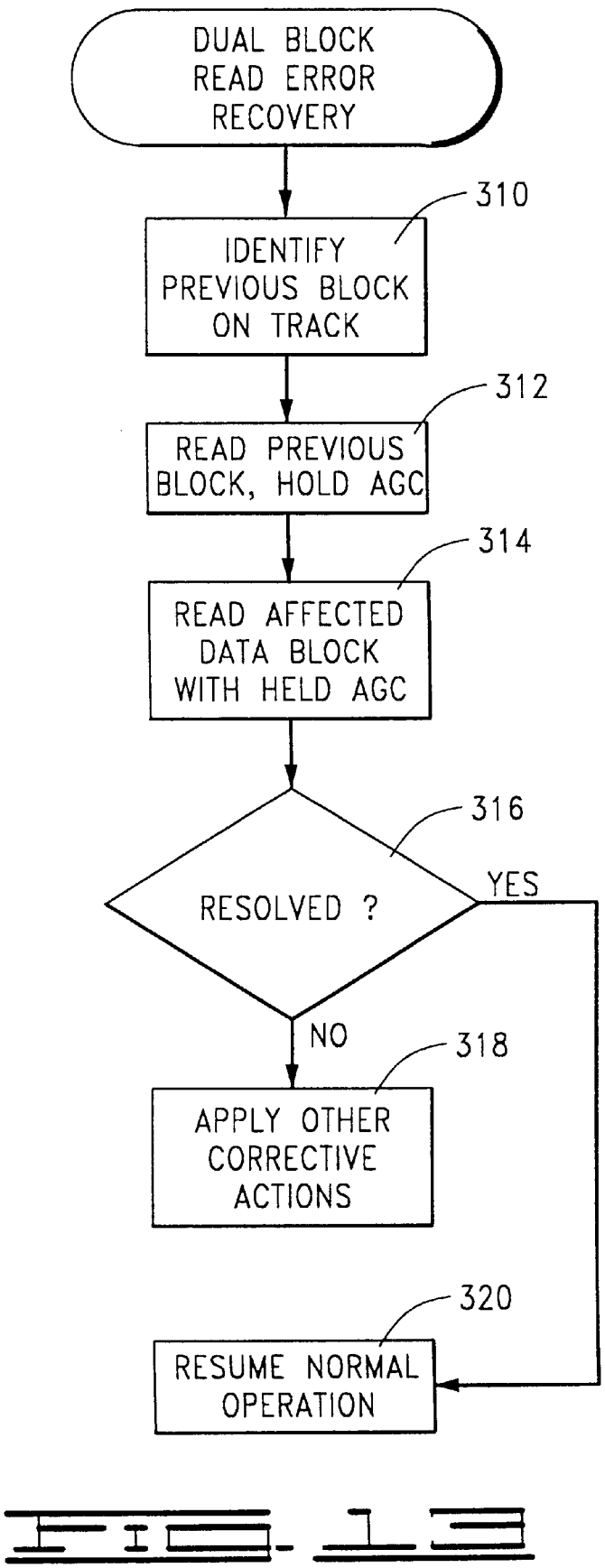
FIG. 13 provides a flow chart illustrating a DUAL BLOCK READ ERROR RECOVERY routine generally setting forth the steps performed by the disc drive in accordance with the preferred embodiment of the present invention.

Turning now to FIG. 13, shown therein is a flow chart representative of the operation of the disc drive 100 during a DUAL BLOCK READ ERROR RECOVERY routine in accordance with the preferred embodiment of the present invention as disclosed above. The routine of FIG. 13 will preferably be performed as part of a higher level read error recovery operation in which a number of corrective actions of varied complexity are systematically applied in order to resolve a read error condition, as is generally common in the art.

The routine of FIG. 13 begins at block 310 wherein the previous block (data block, header or portion of a data block) on the particular track housing the affected data block is identified. Such identification may include reference to a reallocation table resident for example in system processor MEM 154 (FIG. 2), as the previous block is the immediately preceding physical block, not necessarily the immediately preceding logical data block. Moreover, this identification may further include reference to additional tables to determine whether the immediately preceding block is a header 206 (FIGS. 5, 11), whether a servo block 202 is disposed between the affected data block 204 and the previous block (FIG. 12) or whether the affected data block is split by a servo block 202 (FIGS. 7, 12). Conversely, the identification of the previous block can be readily performed by simply identifying the blocks on the track as they pass under the head 118 until the affected data block is reached, although such a method will necessarily consume an additional rotation of the discs 108. It will be readily understood that the previous block identified by the operation of block 310 in FIG. 13 is any block suitable for establishing and holding the gain of the AGC stage of the VGA 164 (FIG. 3), which will generally be any type of block except a servo block 202, as the frequency content of the servo blocks 202 is typically inadequate for the read channel 160.

Once the previous block is identified, the head 118 proceeds to read the previous block and hold the AGC at an appropriate point during (or immediately after) the previous block, as indicated by block 312. As provided above, the point at which the AGC is held depends on a variety of considerations, such as the amount of gain drift and the probability of setting and holding the AGC gain concurrently with the occurrence of a thermal asperity.

The read channel 160 proceeds to next read the affected data block using the previously acquired and held gain level for the AGC, as indicated by block 314 of FIG. 13. When the read error condition associated with the affected data block has been caused by the occurrence of a thermal asperity proximate to the affected data block sufficient to prevent the detection of the sync word within the affected data block, the operation of block 314 will generally enable the sync word detector 178 to successfully decode the sync word and so the user data will likely be recovered by the operation of block 314.

Decision block 316 shows that a determination is then made whether the read error condition was resolved; if not, the routine passes to block 318 wherein other corrective actions are performed by the disc drive 100 in an attempt to resolve the read error condition. It is contemplated that such corrective actions might not only encompass those that are presently well known in the art (such as track offsets, read channel adaptation, and the like), but such corrective actions might also encompass the reperformance of blocks 312 and 314 of FIG. 13, this time initiating the holding of the AGC gain at a different point in time with respect to the previous block.

At such time that the operation of the routine of FIG. 13 is successful in resolving the read error condition associated with the affected data block, however, the flow passes from decision block 316 to block 320, wherein normal disc drive operation is resumed.

Accordingly, in view of the foregoing it will be recognized that the present invention generally comprises a method and apparatus whereby a disc drive (such as 100) can retrieve user data from a data block (such as 204) that is adversely affected by an anomalous condition, such as a thermal asperity.

In accordance with the disclosed method, a previous block (such as 204, 206) disposed on the same track (such as 200) and sequentially preceding the affected data block is read (such as by block 312), during which a gain for the amplification of readback signals (such as 188) to a range sufficient for use by a read channel (such as 160) is set to a fixed value. The affected data block is subsequently read (such as at block 314) using the fixed value of gain determined from the reading of the previous block in order to resolve the read error (such as shown at block 316, 320) and recover the user data from the affected data block.

In accordance with the disclosed apparatus, a disc (such as 108) having a plurality of nominally concentric tracks (such as 200) is provided, each track having a plurality of sequentially disposed blocks (such as 204, 206) used to facilitate the storage and retrieval of user data, the blocks including data blocks (204) in which the user data is stored in preselected increments. A head (such as 118) generates readback signals in response to the passage of the blocks (such as 204, 206) proximate to the head, the readback signals being provided to a read channel (such as 160) having an automatic gain control stage (such as disclosed with regard to the VGA 164) which establishes a gain in response to the levels of the readback signals, the gain used to amplify the readback signals to a range suitable for use by the read channel.

The read channel further includes gain holding circuitry (such as 150, 152, 164) which selectively holds the gain at a fixed value determined from the readback signals generated by the head as a first block (such as 204, 206) on a selected track passes proximate to the head, the gain holding circuitry holding the gain at the fixed value as a subsequent data block (such as 206) on the selected track affected by a read error condition passes proximate to the head, the automatic gain control stage utilizing the fixed value to recover the user data from the subsequent, affected data block.

Finally, it will be recognized that for purposes of the following claims, the term "circuit" will be broadly understood to include both hardware and firmware implementations. Likewise, the phrase "previous block" will be understood to be a block, including for example a data block or a header block, that comes before a data block affected by a read error condition. Finally, "sequentially preceding" will be readily understood to mean coming before with respect to passage of blocks on a track proximate to a head.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive in which user data are stored in a data block disposed on a track of a rotating disc, the disc drive including a read channel for recovering the user data from the data block, the read channel utilizing a gain determined by an automatic gain control stage of the read channel in response to input signal levels provided to the read channel, a method for recovering the user data from the data block comprising steps of:

(a) reading a previous block disposed on the track, the previous block sequentially preceding the data block on the track;

(b) using the automatic gain control stage to obtain a fixed value of the gain in response to at least a portion of the input signal levels provided to the read channel as the previous block is read; and (c) reading the data block while holding the gain at the fixed value of the gain to recover the user data from the data block.

2. The method of claim 1, wherein the previous block comprises another data block disposed immediately before the data block on the track from which the user data is recovered.

3. The method of claim 1, wherein the previous block comprises a header block disposed immediately before the data block on the track.

4. The method of claim 1, wherein a servo block is disposed on the track between the data block and the previous block.

5. A disc drive, comprising:

a rotatable disc having a plurality of nominally concentric tracks, each of the tracks having a plurality of sequentially disposed blocks used to facilitate the storage and retrieval of user data, the blocks including data blocks in which the user data are stored in predefined increments;

a head controllably positionable with respect to the tracks, the head generating readback signals in response to passage of the blocks proximate to the head;

a read channel, responsive to the head, for recovering the user data from the data blocks, the read channel comprising:

an automatic gain control stage responsive to the head for establishing a gain in response to levels of the readback signals provided to the read channel, the gain used to amplify the readback signals to a range suitable for use by the read channel; and gain holding circuitry for selectively holding the gain at a fixed value determined from the readback signals generated by the head as a first block on a selected track passes proximate to the head, the gain holding circuitry holding the gain at the fixed value as a subsequent data block on the selected track passes proximate to the head during a read error recovery operation associated with the subsequent data block, the automatic gain control stage utilizing the fixed value to recover the user data from the subsequent data block.

6. The disc drive of claim 5, wherein the first block comprises a data block disposed immediately before the subsequent data block on the selected track.

7. The disc drive of claim 5, wherein the first block comprises a header block disposed immediately before the subsequent data block on the selected track.

8. The disc drive of claim 5, wherein the disc drive further comprises a servo control circuit used to control the position of the head with respect to the tracks, and wherein a servo block comprising prerecorded servo information used by the servo control circuit is disposed on the selected track between the first block and the subsequent data block.

9. A read channel responsive to a readback signal for recovering data from the readback signal, the readback signal generated from successive blocks of previously stored patterns, the read channel comprising:

an automatic gain control stage establishing a gain level for use by the read channel in that the readback signal is multiplied by the gain to bring the readback signal to a signal range suitable for the read channel, the gain nominally established in response to amplitudes of the readback signal; and gain holding circuitry for selectively holding the gain at a fixed value established by the automatic gain control stage in response to the amplitudes of the readback signal associated with a first block, the gain holding circuitry holding the gain at the fixed value so that the readback signal associated with a second block following the first block is multiplied by the fixed value of the gain, the second block comprising a data block storing user data.

10. The read channel of claim 9, wherein the first block comprises a data block storing user data.

11. The read channel of claim 10, wherein a servo block comprising servo control information is disposed between the first and second blocks.

12. The read channel of claim 9, wherein the first block is a header block comprising logical block address information associated with the second block.

* * * * *

UNITED STATES PATENT AND TRADEMARK OFFICE
CERTIFICATE OF CORRECTION

PATENT NO. : 6,055,118
DATED : April 25, 2000
INVENTOR(S) : Ke Du

Page 1 of 1

It is certified that error appears in the above-identified patent and that said Letters Patent is hereby corrected as shown below:

Column 3,
Line 11, replace "great detail" with -- greater detail --.

Column 9,
Line 45, replace "data are" with -- data blocks are --.
Line 46, replace "data are" with -- data blocks are --.

Signed and Sealed this

Twenty-sixth Day of February, 2002

Attest:

JAMES E. ROGAN
Attesting Officer  Director of the United States Patent and Trademark Office